United States Patent [19]

Kielsmeier et al.

[11] E Patent Number: Re. 33,508

[45] Reissued Date of Patent: Dec. 25, 1990

[54] PIZZA PREPARATION FROM COMMINUTED CHEESE

[75] Inventors: Lester O. Kielsmeier, Lakewood; Richard L. Barz, Longmont; Wesley J. Allen, Littleton, all of Colo.

[73] Assignee: Leprino Foods Company, Denver, Colo.

[21] Appl. No.: 428,491

[22] Filed: Oct. 27, 1989

Related U.S. Patent Documents

Reissue of:

[64] Patent No.: 4,753,815
Issued: Jun. 28, 1988
Appl. No.: 36,022
Filed: Apr. 8, 1987

[51] Int. Cl.[5] ..... A23C 19/00; A23C 1/08; A23C 19/068; A23C 19/08

[52] U.S. Cl. ..... 426/582; 426/96; 426/296; 426/302; 426/524

[58] Field of Search ..... 426/582, 293, 302, 305, 426/296, 524, 68, 89, 98, 100, 291, 92, 289

[56] References Cited

U.S. PATENT DOCUMENTS

| | | | |
|---|---|---|---|
| 3,184,318 | 5/1965 | McCadam | 426/582 |
| 4,112,834 | 9/1978 | Thiry | 99/450.1 |
| 4,416,904 | 11/1983 | Shannon | 426/19 |
| 4,461,781 | 7/1984 | Akesson et al. | 426/524 |
| 4,588,612 | 5/1986 | Perkins et al. | 426/307 |
| 4,687,672 | 8/1987 | Vitkovsky | 426/524 |
| 4,753,815 | 6/1988 | Kielsmeier et al. | 426/582 |
| 4,894,245 | 1/1990 | Kielsmeier et al. | 426/582 |

FOREIGN PATENT DOCUMENTS

| | | | |
|---|---|---|---|
| 561821 | 8/1984 | Australia . | |
| 578432 | 10/1988 | Australia . | |
| 2075326 | 11/1981 | United Kingdom | 426/68 |

OTHER PUBLICATIONS

Potter, N. Food Science, 1933, Avi Publishing Co., Inc., pp. 223–224.

*Primary Examiner*—Marianne Cintins
*Assistant Examiner*—H. Pratt
*Attorney, Agent, or Firm*—Tilton, Fallon, Lungmus & Chestnut

[57] ABSTRACT

Cheese of the kind used on pizzas is prepared in granular form, and frozen by an individual quick freezing method to maintain granule moisture and distribution. The resulting free-flowing granules can be baked on pizzas in frozen or partially frozen condition while obtaining as good quality baked pizzas as when fully thawed granule cheese is used. The problem of undue browning and blistering heretofore associated with the use of frozen cheese is avoided.

10 Claims, No Drawings

PIZZA PREPARATION FROM COMMINUTED CHEESE

Matter enclosed in heavy brackets [ ] appears in the original patent but forms no part of this reissue specification; matter printed in italics indicates the additions made by reissue.

FIELD OF INVENTION

The field of this invention is the use of comminuted cheese on baked pizza.

BACKGROUND OF INVENTION

In the United States, many retail operations engaged in preparation and baking of pizzas desire to use cheese in a comminuted form. Consequently, producers of mozzarella and other cheese used on pizzas shred or dice block cheese for delivery to the pizza restaurants. To provide improved storage and keeping qualities, comminuted cheese for use on pizzas can be frozen and delivered in frozen or semi-frozen condition. However, the cheese must at least be thawed to the extent that the shreds or granules can be separated. Moreover, further thawing is needed to improve functionality.

The use of comminuted cheese in frozen or partially frozen condition on pizzas frequently results in baked products showing excessive browning and blistering. Not only is this appearance unattractive to the consumer, but the flavor and eating quality can also be adversely affected.

The recommended practice involves slow thawing of the frozen cheese. Where thawing is carried out during non-freezing refrigerated storage, as is a common practice, a minimum of two to three days of thawing-holding is usually required. Moreover, the best practice involves holding of the granular cheese for four to five days, until thawing is completed.

Because of the problems associated with the use of frozen comminuted cheese for preparing pizza, certain franchised cheese restaurants require that the comminuted cheese be packaged non-frozen in specially designed packages. This adds considerably to packaging and distribution expenses, although it does avoid the necessity of slow thawing.

As far as is known, no one heretofore has produced frozen comminuted cheese which can be applied to pizzas in frozen or partially frozen condition and baked to produce a pizza product of as good quality as with fully thawed cheese. The high standards of appearance, quality and taste for large scale pizza preparation have not been satisfied by the use of comminuted cheese which has not been completely thawed.

SUMMARY OF INVENTION

The development of this invention has required a better understanding of the problems associated with the use of comminuted cheese on pizzas. It was observed that the frozen granules of comminuted cheese usually had visible ice coatings on their outer surfaces. Examination disclosed that this ice is formed as the granules are frozen-moisture being exuded and freezing around the granules. Consequently, when thawing was commenced the outer surfaces became wet, but by holding of the granules for several days, the free moisture was reabsorbed. With holding periods of four to five days, substantial equilibration of moisture distribution was obtained, although this had not been previously recognized. In effect, the interior moisture of the cheese particles redistributed substantially as it was before freezing. Without such holding and equilibration, the ice coatings melted and the water flashed off as the pizzas were baked. This invention involves a recognition that such water loss can aggravate undesirable browning and blistering.

It was found that to produce pizza of the most pleasing appearance and taste, it is important to fully maintain the moisture content of the applied cheese. As the moisture flashes off, the resulting steam can raise blisters. In blistering, the protein layers are lifted from the surface of the baking pizzas. Such blisters tend to burn and discolor.

This invention provides for the first time frozen comminuted cheese which can be used on pizzas without any prethawing. The resulting baked pizzas have as good or better appearance and quality as when prepared from fully thawed and equilibrated cheese. To achieve this result it is necessary to freeze the granules very rapidly, so that the frozen granules have essentially the same moisture content and distribution as before freezing. Rapid freezing prevents moisture migration to the surface of the cheese particles. The frozen particles are free from visible ice coatings, and the moisture within the particles is in the form of very fine crystalline ice.

When the frozen cheese of this invention is thawed during baking, it immediately has the optimum moisture distribution for baking. No holding time is needed for moisture equilibration. Moreover, during baking the contacting surfaces of the cheese particles thaw first, becoming softened with particle-to-particle fusing. In fact, the particulate cheese can begin to fuse into smoothly melted layers while the interiors of the individual particles are still partially frozen. Using frozen cheese of the kind prepared by the method of this invention does not interfere with normal melting of the cheese on pizzas baked very rapidly. In the practice of using convection ovens through which the pizzas pass on conveyor belts, baking times are usually less than ten minutes for both "thick" and "thin" crust type pizzas. Nevertheless, by using the method of this invention, the baked cheese appears smooth and non-lumpy. Separate cheese particles are not apparent. The melted cheese exhibits an appearance comparable to that obtained with fully thawed cheese.

Since the frozen cheese produced in accordance with this invention is in a particulate free-flowing condition, it can be subjected to new processing operations. Where blends of two or more kinds of cheese are desired for use on pizzas, each of the cheeses may be prepared separately and mixed to provide the blend. Modification of taste and functional properties of the cheese can be obtained by applying coatings to the outsides of the cheese particles.

The method of this invention for preparing baked pizzas and the frozen cheese for use therewith greatly improves the production, storage, distribution, and use of comminuted cheese. After the frozen cheese has been prepared by the method of this invention, it can be stored for many months without deterioration in quality. The moisture is locked into the cheese in the form of very finely distributed ice crystals, and there is substantially no moisture loss during frozen storage. The cheese therefore maintains its capacity for use in frozen condition to produce fully acceptable pizza products.

DETAILED DESCRIPTION

The term "comminuted cheese" as used herein refers to shredded or diced cheese of the kind which heretofore has been sold for use in producing pizza products. The term "granule" is used generically as referring to the particulate form of such shredded or diced cheese. The granules are usually of cubical or an elongated rectilinear shape. However, the granules may also be slivers of irregular shape.

In practicing the method of this invention, any cheese may be employed of the kind used on pizzas. In the United States, varieties of mozzarella are the most common type cheese for pizza use, and are used alone or in cheese blends. The term "pizza cheese" usually refers to a semi-soft part skim milk cheese which is similar to but not the same as mozzarella. Other varieties of cheeses used on pizza include cheddar, Muenster, Swiss, and Provoline. Such cheeses are usually produced in block form. For purpose of this invention, the cheese blocks are comminuted to shreds or granules. For example, the block cheese can be sliced and then diced to form cubical or elongated granules. Alternatively, cheese shredding equipment can be used. The granules may have dimensions in inches of from $0.1\times0.1\times0.5$ up to $0.25\times0.25\times1.5$. Examples of representative granule shapes are: (1) $\frac{1}{8}\times3/16\times\frac{3}{4}$ inches; and (2) $\frac{1}{8}\times\frac{1}{8}\times\frac{1}{8}$ inches.

The cheese used on pizzas has relatively large moisture content, containing at least 30% water by weight and usually higher. Applicable federal moisture standards are illustrative. In the case of cheese which is classified as "low-moisture mozzarella" or Scamorza, the federal standard specifies a moisture content in the range of 45 to 52%; Muenster (munster) cheese can contain up to 46% moisture, etc. Despite these high moisture contents, it is undesirable to process the cheese in such a way that moisture content of the frozen particles is substantially lower. For protection of functionality, the frozen cheese of the present invention can be prepared with less than 1% weight reduction due to moisture loss. Optimally, the weight reduction of the cheese due to moisture loss can be limited to 0.3 to 0.5 wt. %. In carrying out the method of this invention, the comminuted cheese is rapidly frozen by direct contact with low temperature air. The freezing air should be at a temperature below $-10°$ F. and preferably below $-20°$ F. For example, the optimum air temperature is as low as $-35°$ to $-45°$ F.

To accomplish rapid freezing of the comminuted cheese, a bed of the granules can be directly contacted by freezing air. For example, the cheese granules may be contacted in a fluidized bed, or in an agitated bed for rapidly exposing all exterior surfaces of the granules to the freezing air. By passing the freezing air upwardly through beds in which the cheese particles are agitated, or preferably fluidized, the air flow can contact all of the exterior surfaces of the particles. With air at a sufficiently low temperature, suface crusts will rapidly form on the granules, thereby locking in the moisture.

Commercially available equipment can be used for the freezing of the comminuted cheese. This equipment is of the kind sold for individual quick freezing (IQF) of granular food products. Heretofore, "IQG" equipment has been employed primarily for freezing vegetables, and the freezing step has usually been accompanied by partial drying of the product. In preparing the frozen cheese for the purpose of this invention, as explained above, it is desirable to avoid moisture loss from the cheese as it is being frozen.

In one preferred method of freezing the comminuted cheese, fluidized bed-type IQF equipment is employed. Such fluidized bed equipment is described in U.S. Pat. Nos. 3,169,381, 4,265,095, and 4,478,141. Commercially, suitable IQF fluidized bed equipment is available from Frigoscandia (Frigoscandia Contracting, Inc., Bellevue, Wash.). Expanded bed-type freezing equipment is available from several suppliers, including Cloud & Britton, Inc., Mountlake Terrace, Wash.

In preparing the comminuted cheese for freezing, precooling of the cheese is not required, that is, the cheese may be at temperatures substantially above 32° F. For example, temperatures in the range of 35°-55° F. can be used, up to ambient room temperature. After the comminuted cheese is completely frozen, typically requiring from five to ten minutes, the cheese granules will be at very cold temperatures, but somewhat above the temperature of the freezing air. For example, the temperature of the frozen cheese will usually be below 0° F., such as at a temperature of from about $-10°$ to $-20°$ F.

After the cheese is frozen as described, the shreds or granules should be in an individual free-flowing form. The particulate cheese can then be further processed on a conveyor belt, or other equipment, as desired. For example, frozen cheese of two different kinds can be mixed to provide a blend for use on pizzas, or the cheese particles may be sprayed with an aqueous carrier containing one or more cheese additives, such as flavor modifiers, emulsifiers, etc. Any GRAS-approved additive can be used. The additive may be in an aqueous solution, dispersion, or emulsion. The carrier should contain sufficient water so that it will freeze on the cheese particles.

It is desirable to mix or agitate the cheese while the coatings are being applied. This can be done in a fluidized bed, such as near the discharge end of the fluidized bed IQF freezer. Alternatively, a conveyor belt can be equipped with devices for mixing the cheese particles as they are coated. Spray application of the coatings will usually be most convenient. As the aqueous carrier is distributed over the outer surfaces of the cheese granules, the carrier can be rapidly converted to frozen layers. At the same time, the coated granules can remain free-flowing.

When the coated frozen cheese is applied to pizzas and baked thereon, the coatings will liquify first. This permits the flavor additive and/or emulsifier to spread over and into the cheese particles as their outer surfaces become thawed. The water in the coating will then flash off. In this way, special flavor characteristics can be imparted with relative uniformity to the melted cheese layer on the pizza. Cheese emulsifiers applied in this way can function to soften the outer portions of the cheese granules. This will improve melting and fusing of the granules.

To assure that the moisture distribution in the cheese particles during frozen storage remains essentially unchanged, it has been found desirable to store the cheese at freezing temperatures no lower than the one at which it was originally prepared. Migration of ice and enlargement of ice crystals an occur if the cheese is stored at lower freezing temperatures after it has been held at a higher temperature. A series of storages at successively higher freezing temperatures is a convenient practice. For example, when the cheese is originally frozen at a temperature below −10° F., it can be stored first at −10° to 0° F., and next at 0° F. to 10° F.

The frozen granules may be packed in plastic bags and the bags placed in cartons for shipment or storage. In prior practice, frozen storage of granular cheese was limited to about six months without loss of quality. It is surprising therefore that the frozen cheese granules of this invention can be stored for periods of over 12 months without any quality deterioration. This storability feature facilitates production by the cheese manufacturer in the seasons of the year when milk is abundant. As stated above, to maintain the cheese in optimum condition, it has been found desirable to utilize successively higher ranges of storage temperatures. This avoids storage holding in which the granules are stored at a lower temperature than the initial frozen storage temperature.

When the frozen product reaches the retail pizza outlets, it is not necessary to completely thaw the cheese prior to use. For example, the cheese may be taken directly from frozen storage and applied to pizzas just prior to baking. However, handling practices and available cheese storage facilities vary considerably. Some restaurants may not be equipped for frozen storage, and/or the cheese may have been permitted to become partially thawed before it reaches the restaurant. These differences are not matters for concern when employing the frozen comminuted cheese of this invention. Excellent results can be obtained without regard to whether the cheese is in fully frozen or partially frozen condition as used on the pizzas. The baked pizzas will have as good or better appearance when prepared by the method of this invention as those prepared from thawed and equilibrated cheese. Of course, the degree of browning of the cheese on the baked pizzas depends in part on the baking equipment and temperatures used. But on a comparative basis the pizzas prepared from the frozen granules will exhibit no more browning or blistering than pizzas prepared from fully thawed and equilibrated granules.

PROCESS EXAMPLE

Shredded mozzarella cheese is prepared in a granule size of about $\frac{1}{8} \times 3/16 + \frac{3}{4}$ inches. The granules are subjected to IQF fluidized bed freezing in a "FLo-FREEZE" Model 300 WS-ADF supplied by Frigoscandia Contracting, Inc., Bellevue, Wash. The freezing and fluidizing air which is blown upwardly through the bed of granules can have a velocity of around 400 ft/min. and a temperature of about −40° F. Frozen crusts form rapidly around the outside of the granules, viz. in one to two minutes or less. The time required for completion of the freezing is of the order of 7 minutes. The frozen granules leaving the fluidized bed have a temperature of around −20° F. Weight loss due to moisture evaporation during the freezing process is less than 0.5%. Baffles along the sides and over the fluidized bed to minimize loss of cheese fines are provided. The frozen granules are packed in bags and boxed for storage, for example, at a temperature from −10° to 0° F.

COATING EXAMPLES

Coatings for the frozen cheese can include one or more of the following flavor additives: lactose, glucose, diacetyl, free fatty acids (i.e., butyric, propionic, capric, caproic acids), cheese flavors (cheddar, Swiss, Provolone, etc.), meat flavors (bacon, pepperoni, sausage, etc.), spices (basil, oregano, garlic, dill, cinnamon, fennel, etc.), vegetable flavors (tomato, onion, pimiento, pepper, etc.), and fruit flavors (strawberry, pineapple, cherry, lemon, etc.). Emulsifer additives, which may be used either alone or with the flavor additives, include: surfactants, disodium phosphate, silicone, emulsifiers, and other GRAS-approved emulsifiers.

The following formulations are illustrative.

Emulsifier Coating Solution

A silicone emulsifier (Dow Corning FG-10) is mixed with water to form a 0.05% emulsifier solution. This solution is sprayed on the frozen cheese granules at a rate of 1.75 parts of solution per 100 parts by weight of cheese. This should achieve a final content of around 0.09% emulsifier on the cheese.

Smoke Flavor Coating Solution

A smoke flavor (Red Arrow P-50 Hickory Smoke) is mixed with water to form a 4.5% solution thereof. The solution is sprayed on the frozen cheese granules at a rate of 2.2 parts by weight of solution per 100 parts of cheese. This should achieve a final content of about 0.1% smoke on the cheese.

Swiss Flavor Solution

A Swiss cheese flavor (Naarden International Cheese Flavor Swiss Type) is mixed with water to form a 50% by weight solution. The solution is sprayed on the frozen cheese granules at a rate of 0.5 parts of solution per 100 parts by weight of cheese. This should achieve a final content of about 2.5% Swiss flavor on the cheese.

The above solutions should be applied gradually while the frozen cheese granules are being mixed to distribute the solution over the outer surfaces of the granules. This produces thin frozen coatings around the outside of the granules while the granules remain in individual free-flowing condition.

Other Uses

In addition to commercial pizza preparation for sale in restaurants, the method of the present invention is also applicable to the home baking of pizzas sold in frozen condition. A manufacturer preparing pizzas for sale through retail outlets to home consumers can apply the comminuted frozen cheese of this invention to unbaked, unfrozen pizza, then without thawing the cheese the rest of the pizza is frozen by any suitable procedure. The unbaked frozen pizzas are distributed and sold in frozen condition. When a frozen pizza is purchased and baked at home without thawing, the advantages of this invention for baking the cheese in frozen or partially frozen condition will be obtained. By applying the frozen cheese granules to unbaked, unfrozen pizzas, a further advantage is provided. The frozen granules do not absorb the tomato or other liquid sauces. This protects the baking properties of the cheese granules against deterioration by absorption of an acidic sauce.

In still another application of the method of this invention, the comminuted frozen cheese may be packaged for sale to home users. As with commercial pizza manufacturers, the home user may apply the frozen or partially frozen cheese granules to pizza, and then bake the pizza without further holding. The frozen cheese granules may also be used as toppings on other food products which can be baked without thawing of the cheese. It should be understood that these alternative uses of the present invention are included within the scope of this application.

We claim:

1. The method of producing baked pizza, comprising the steps of:

(a) preparing cheese *at a cheese processing plant* in the form of fresh cheese granules, said cheese consisting of at least one variety of mozzarella, or a blend of mozzarella with other cheese, said blend being adapted for use on baked pizza;

(b) freezing said cheese granules by individual quick freezing thereof, the cheese granules being frozen at a temperature below −10° F. which freezes the granules so rapidly that the individual granules retain essentially the same moisture content and distribution as before freezing, the resulting frozen granules being in free-flowing condition;

(c) maintaining said granules *during storage and shipment* in frozen free-flowing condition with said moisture substantially unchanged until the granules are used;

(d) *in a retail pizza outlet or restaurant* applying the granules so maintained to pizzas being prepared [for] *just prior to* baking without complete thawing of the granules, at least the interiors thereof being frozen; and (e) baking the pizzas with the applied unthawed granules and obtaining baked pizzas of good appearance and quality.

2. The method of claim 1 in which said granules are applied to the pizza in an essentially fully frozen condition and are baked thereon from said frozen state.

3. The method of claim 1 in which an aqueous carrier containing one or more cheese additives is applied to the frozen granules prepared in step (b) and frozen surface coatings of said carrier are formed thereon, the resulting coated granules being used in steps (c), (d) and (e).

4. The method of claims 1, 2, or 3 in which said cheese granules are prepared entirely from varieties of mozzarella.

5. The method of producing baked pizza, comprising the steps of:

(a) preparing cheese *at a cheese processing plant* in the form of fresh cheese granules, said cheese consisting of at least one variety of mozzarella, or a blend of mozzarella with other cheese, said blend being adapted for use on baked pizza;

(b) freezing said cheese granules by blowing air at a temperature below −20° F. through a fluidized bed of the granules, said granules being frozen so rapidly that the individual granules retain essentially the same moisture content and distribution as before freezing, the resulting frozen granules being in free-flowing condition;

(c) maintaining said granules *during storage and shipment* in frozen free-flowing condition with said moisture substantially unchanged until the granules are used;

(d) *in a retail pizza outlet or restaurant* applying the granules so maintained to pizzas being prepared [for] *just prior to* baking without complete thawing of the granules, at least the interiors thereof being frozen; and (e) baking the pizzas with the applied unthawed granules and obtaining baked pizzas of good appearance and quality.

6. The method of claim 5 in which an aqueous carrier containing a flavor additive, or a cheese emulsifier additive, or both of said additives is applied to the frozen granules prepared in step (b) and frozen surface coatings of said carrier are formed thereon, the resulting coated granules being used in steps (c), (d) and (e).

7. The method of claim 5 in which granules of mozzarella and granules of at least one of said other cheese are separately prepared in step (a), separately frozen in step (b), and then mixed to provide the granules used in steps (c), (d) and (e).

8. The method of claim 5 in which said cheese granules are prepared entirely from varieties of mozzarella.

9. The method of claim 1 or claim 5 in which said frozen granules in step (c) are maintained by storage at a freezing temperature no lower than the temperature at which the granules were originally frozen.

10. The method of claim 1 or claim 5 in which said frozen granules in step (c) are maintained by storage at a series of freezing temperatures higher than the temperature at which they were originally frozen, the freezing temperatures of said series being progressively higher temperatures.

[11. The method of preparing and baking pizza, comprising the steps of:

(a) preparing cheese in the form of fresh cheese granules, said cheese consisting of at least one variety of mozzarella, or a blend of mozzarella with other cheese, said blend being adapted for use on baked pizza;

(b) freezing said cheese granules by individual quick freezing thereof, the cheese granules being frozen at a temperature below −10° F. which freezes the granules so rapidly that the individual granules retain essentially the same moisture content and distribution as before freezing, the resulting frozen granules being in free-flowing condition;

(c) applying the frozen cheese granules as a topping to unbaked, unfrozen pizza;

(d) freezing the pizzas with the frozen cheese granules thereon; and thereafter (e) baking the pizzas in frozen or partially frozen condition while the cheese granules have essentially the same moisture content and distribution, at least the interiors of the cheese granules being frozen at the start of said baking.]

[12. The method of claim 11 in which an aqueous carrier containing one or more cheese additives is applied to the frozen granules prepared in step (b) and frozen surface coatings of said carrier are formed thereon, the resulting coated granules being applied to the pizzas in step (c).]

[13. The method of claim 11 or claim 12 in which said cheese granules are prepared entirely from varieties of mozzarella.]

* * * * *